United States Patent
Hayashi et al.

(10) Patent No.: US 12,384,421 B2
(45) Date of Patent: Aug. 12, 2025

(54) VEHICLE, ELECTRONIC SIGNATURE ISSUING SYSTEM, STORAGE MEDIUM, AND ELECTRONIC SIGNATURE ISSUING MACHINE

(71) Applicant: TOYOTA JIDOSHA KABUSHIKI KAISHA, Toyota (JP)

(72) Inventors: Masatoshi Hayashi, Nisshin (JP); Josuke Yamane, Nagoya (JP); Daigo Fujii, Nagoya (JP); Yuki Tatsumoto, Seto (JP); Takurou Sakai, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 305 days.

(21) Appl. No.: 18/129,532

(22) Filed: Mar. 31, 2023

(65) Prior Publication Data
US 2023/0421384 A1    Dec. 28, 2023

(30) Foreign Application Priority Data
Jun. 22, 2022 (JP) .................. 2022-100674

(51) Int. Cl.
*B60W 60/00* (2020.01)
*G06Q 30/04* (2012.01)
*G06Q 50/40* (2024.01)
*H04L 9/32* (2006.01)

(52) U.S. Cl.
CPC ....... *B60W 60/00256* (2020.02); *G06Q 30/04* (2013.01); *G06Q 50/40* (2024.01); *H04L 9/3247* (2013.01)

(58) Field of Classification Search
CPC . B60W 60/00256; G06Q 30/04; G06Q 50/40; G06Q 10/083; H04L 9/3247; H04L 2209/84; H04L 9/3226; B60R 16/02; B60P 9/00; B62D 63/02; B62D 63/04; G01S 19/42
See application file for complete search history.

(56) References Cited

U.S. PATENT DOCUMENTS

| | | | |
|---|---|---|---|
| 2016/0239803 A1* | 8/2016 | Borley | G06Q 10/08355 |
| 2018/0137453 A1* | 5/2018 | Gillen | G06Q 10/00 |
| 2020/0339161 A1 | 10/2020 | Otaki | |
| 2020/0361497 A1* | 11/2020 | Hoppe | H04W 4/023 |
| 2021/0201261 A1* | 7/2021 | Anderson | G07C 9/257 |
| 2021/0295242 A1* | 9/2021 | Rathi | G06Q 10/0832 |

FOREIGN PATENT DOCUMENTS

JP    2020181287 A    11/2020

* cited by examiner

*Primary Examiner* — Ig T An
(74) *Attorney, Agent, or Firm* — Dinsmore & Shohl LLP (57) ABSTRACT

A vehicle that autonomously delivers a package includes a control unit that executes communication with an electronic signature issuing machine installed at a delivery destination for collating the package with the delivery destination, acquires an electronic signature from the electronic signature issuing machine when a collation is achieved between the package and the delivery destination, and drives the vehicle such that the package is left at the delivery destination.

9 Claims, 4 Drawing Sheets

VEHICLE, ELECTRONIC SIGNATURE ISSUING SYSTEM, STORAGE MEDIUM, AND ELECTRONIC SIGNATURE ISSUING MACHINE

CROSS-REFERENCE TO RELATED APPLICATION

This application claims priority to Japanese Patent Application No. 2022-100674 filed on Jun. 22, 2022, incorporated herein by reference in its entirety.

BACKGROUND

1. Technical Field

The present disclosure relates to a vehicle, an electronic signature issuing system, a storage medium, and an electronic signature issuing machine.

2. Description of Related Art

Conventionally, a technique for automatically delivering a package using an autonomous driving vehicle has been known. For example, Japanese Unexamined Patent Application Publication No. 2020-181287 (JP 2020-181287 A) discloses an automatic driving delivery system in which a delivery point of a package is more appropriately presented to a user. In such an automatic driving delivery system, a first delivery candidate point or a second delivery candidate point is determined as the delivery point, and before the autonomous driving vehicle starts delivering the package to the determined delivery point, the determined delivery point is presented to the user.

SUMMARY

However, in the above technique, sufficient consideration has not been given to unattended delivery performed when the user at a delivery destination is not at home and cannot receive the package, for example. In such an unattended delivery service, there is a possibility that the package is erroneously delivered.

The present disclosure provides a technique for suppressing erroneous delivery of the package in the unattended delivery service.

A vehicle according to an embodiment of the present disclosure is a vehicle that autonomously delivers a package and includes a control unit that executes communication with an electronic signature issuing machine installed at a delivery destination for collating the package with the delivery destination of the package, acquires an electronic signature from the electronic signature issuing machine when a collation is achieved between the package and the delivery destination, and drives the vehicle such that the package is left at the delivery destination.

A storage medium according to the embodiment of the present disclosure stores a program that causes a vehicle that autonomously delivers a package to execute an operation including: executing communication with an electronic signature issuing machine installed at a delivery destination for collating the package with the delivery destination of the package; acquiring an electronic signature from the electronic signature issuing machine when a collation is achieved between the package and the delivery destination; and driving the vehicle such that the package is left at the delivery destination.

An electronic signature issuing machine according to the embodiment of the present disclosure is an electronic signature issuing machine installed at a delivery destination of a package and connected to a vehicle that autonomously delivers the package so as to be able to communicate with the vehicle, and includes a control unit that executes communication with the vehicle for collating the package with the delivery destination, and provides an electronic signature to the vehicle when a collation is achieved between the package and the delivery destination.

With the vehicle, the electronic signature issuing system, the storage medium, and the electronic signature issuing machine according to the embodiment of the present disclosure, erroneous delivery of the package in the unattended delivery service is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described below with reference to the drawings.

Figure 1:
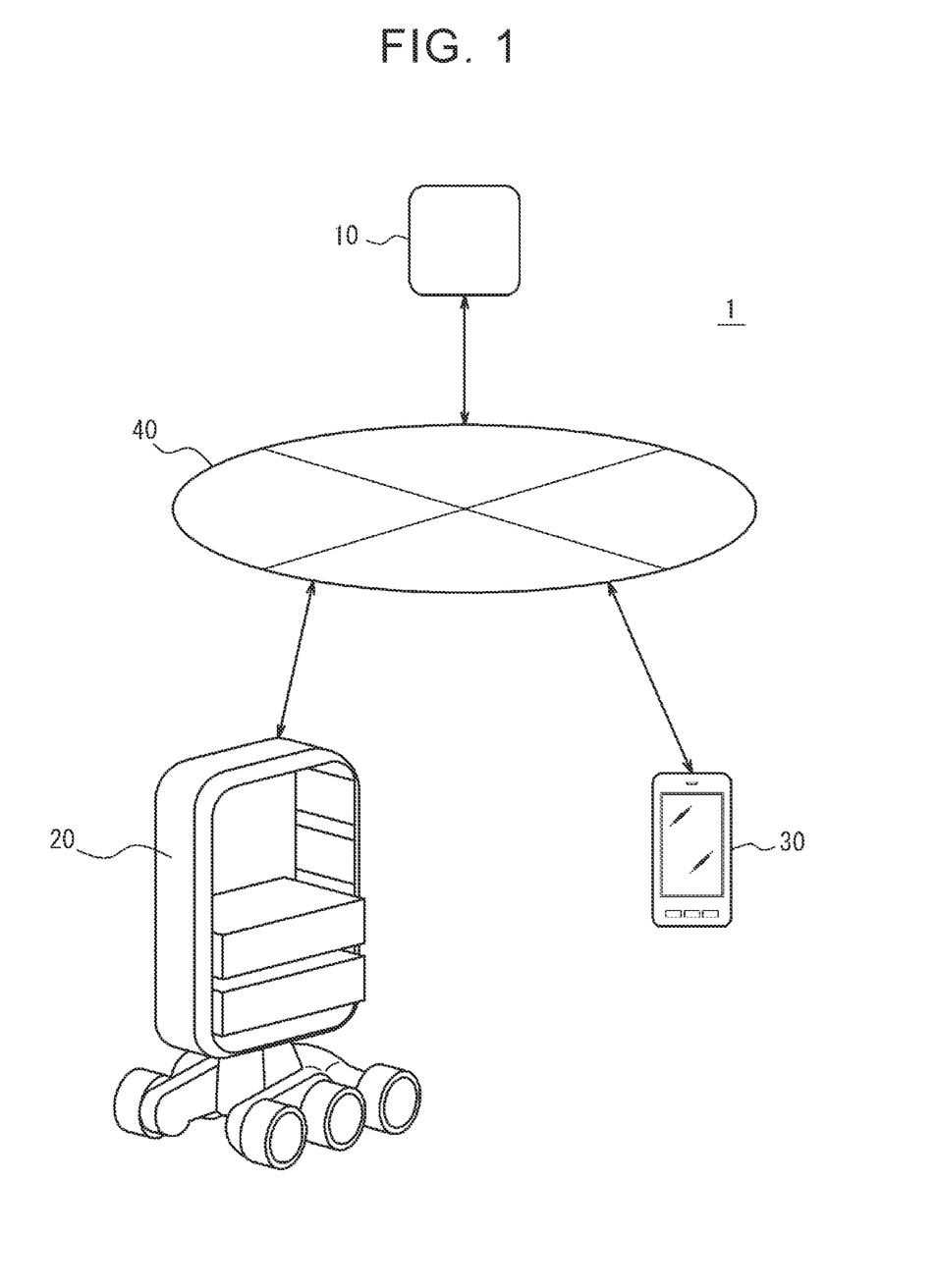
FIG. 1 is a configuration diagram showing a configuration of an electronic signature issuing system including a vehicle according to an embodiment of the present disclosure.

FIG. 1 is a configuration diagram showing a configuration of an electronic signature issuing system 1 including a vehicle 20 according to an embodiment of the present disclosure. An overview of the electronic signature issuing system 1 including the vehicle 20 according to the embodiment of the present disclosure will be mainly described with reference to FIG. 1. The electronic signature issuing system 1 includes an electronic signature issuing machine 10 and a terminal device 30 in addition to the vehicle 20.

For convenience of description, FIG. 1 shows only a single vehicle 20. However, the number of the vehicles 20 included in the electronic signature issuing system 1 may be two or more. For convenience of description, FIG. 1 shows a single electronic signature issuing machine 10 and a single terminal device 30. However, the numbers of the electronic signature issuing machines 10 and the terminal devices 30 included in the electronic signature issuing system 1 may be two or more. Each of the electronic signature issuing machine 10, the vehicle 20, and the terminal device 30 is connected to a network 40 including a mobile communication network, the Internet, and the like so as to be able to communicate with the network 40.

The electronic signature issuing machine 10 is any device capable of providing a signature of a user at a delivery destination as an electronic signature. The electronic signature issuing machine 10 is installed at any location where the electronic signature issuing machine 10 can communicate with the vehicle 20 at the delivery destination such as a user's home, for example. In the present disclosure, the "user" includes, for example, a recipient who receives a package at the delivery destination. The electronic signature issuing machine 10 provides a receiver corresponding to the electronic signature issuing machine 10 with the signature of the user at the delivery destination as the electronic signature in order to prove that the package delivered by the vehicle 20 has been received at the delivery destination. More specifically, the electronic signature issuing machine 10 is directly connected to the receiver mounted on the vehicle 20 that has arrived at the delivery destination by communication means such as wireless communication so as to be able to communicate with the receiver, and transmits the electronic signature to the receiver using the communication means.

The vehicle 20 includes any electrified vehicle that travels between points by autonomous driving. The vehicle 20 includes, for example, a small delivery vehicle that autonomously delivers the package in an unmanned state. The vehicle 20 is not limited to this, and may include any electrified vehicle that performs manned autonomous driving.

The vehicle 20 autonomously delivers the package to at least one delivery destination. When the vehicle 20 arrives at the delivery destination, the vehicle 20 delivers the package addressed to the user at the delivery destination to the user. When the vehicle 20 cannot directly deliver the package to the user due to the absence of the user at the delivery destination, the vehicle 20 leaves the package at a location specified by the user at the delivery destination, or does not leave the package and take this back as necessary.

The terminal device 30 is a general-purpose electronic device such as a smartphone or a personal computer (PC). The terminal device 30 is, for example, an electronic device used by the user at the delivery destination to whom the package is delivered by the vehicle 20. The terminal device 30 is not limited to these, and may be one server device used by the user, a plurality of server devices capable of communicating with each other, or an electronic device dedicated to the electronic signature issuing system 1.

As an overview of the embodiment, the vehicle 20 autonomously delivers the package. The vehicle 20 executes communication with the electronic signature issuing machine 10 installed at the delivery destination for collating the package with the delivery destination of the package, and acquires the electronic signature from the electronic signature issuing machine 10 when a collation is achieved between the package and the delivery destination. The vehicle 20 leaves the package at the delivery destination.

In the present disclosure, "unattended delivery" means that the vehicle 20 leaves the package at a predetermined location and completes the delivery, for example, when the package cannot be received directly due to the absence of the user at the delivery destination.

Figure 2:
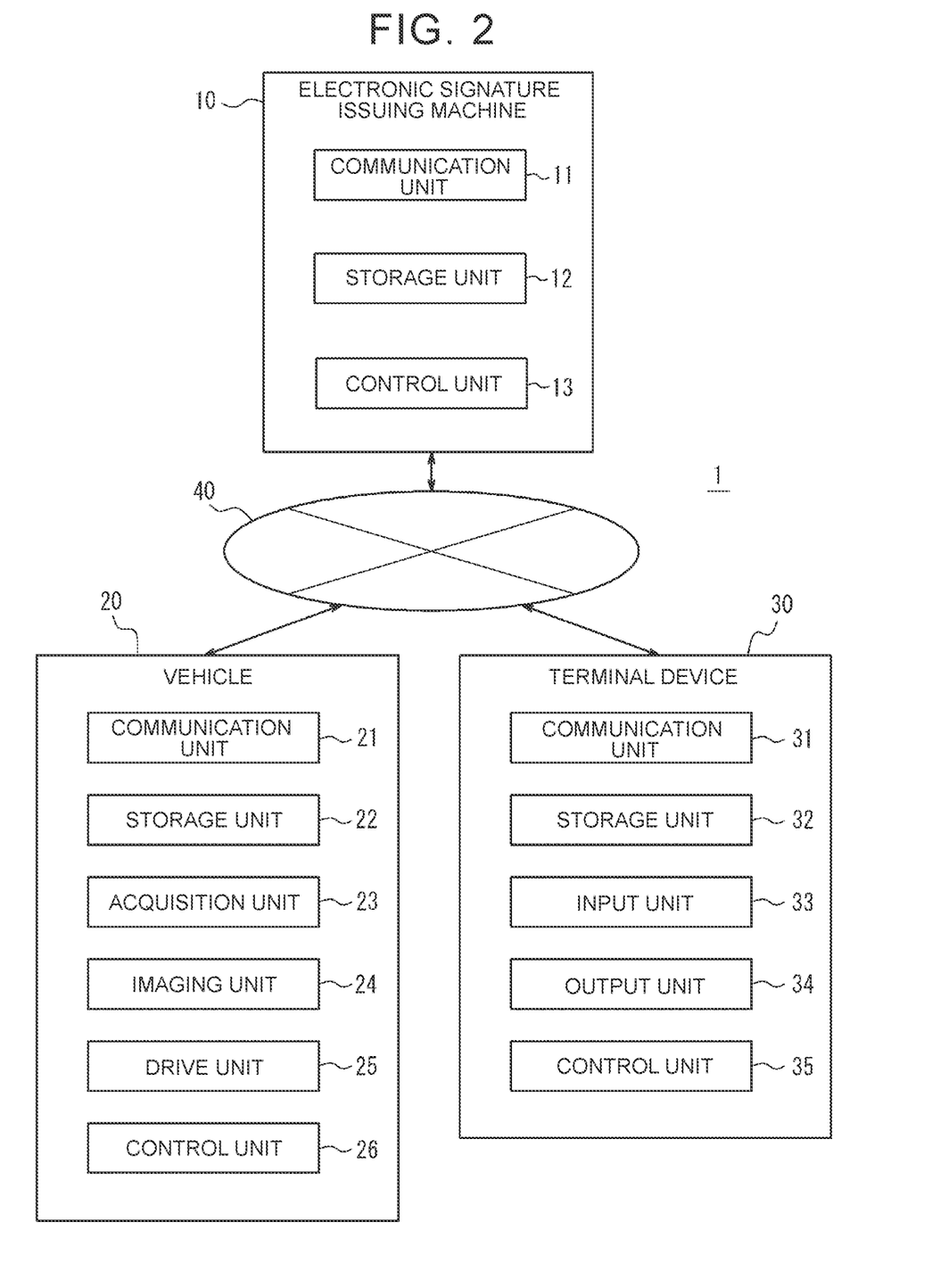
FIG. 2 is a functional block diagram showing a schematic configuration of each of an electronic signature issuing machine, a vehicle, and a terminal device shown in FIG. 1.

FIG. 2 is a functional block diagram showing a schematic configuration of each of the electronic signature issuing machine 10, the vehicle 20, and the terminal device 30 shown in FIG. 1. An example of each configuration of the electronic signature issuing machine 10, the vehicle 20, and the terminal device 30 included in the electronic signature issuing system 1 will be mainly described with reference to FIG. 2.

As shown in FIG. 2, the electronic signature issuing machine 10 includes a communication unit 11, a storage unit 12, and a control unit 13.

The communication unit 11 includes a communication module connected to the network 40. For example, the communication unit 11 includes a communication module corresponding to a mobile communication standard such as the fourth generation (4G) and the fifth generation (5G), or an Internet standard. In the embodiment, the electronic signature issuing machine 10 is connected to the network 40 via the communication unit 11. The communication unit 11 transmits and receives various types of information via the network The storage unit 12 is, for example, a semiconductor memory, a magnetic memory, or an optical memory. However, the storage unit 12 is not limited to these memories. The storage unit 12 functions as a main storage device, an auxiliary storage device, or a cache memory. The storage unit 12 stores any information used for the operation of the electronic signature issuing machine 10. The storage unit 12 stores a system program, an application program, various types of information received or transmitted by the communication unit 11, and the like. The information stored in the storage unit 12 can be updated with the information received from the network 40 via the communication unit 11.

The control unit 13 includes one or more processors. According to the embodiment, the "processor" is a general-purpose processor or a dedicated processor specialized for specific processing. However, the processor is not limited thereto. The control unit 13 is connected to each component constituting the electronic signature issuing machine so as to be able to communicate with each component, and controls the overall operation of the electronic signature issuing machine 10.

The configuration of the vehicle 20 included in the electronic signature issuing system 1 will be mainly described. As shown in FIG. 2, the vehicle 20 includes a communication unit 21, a storage unit 22, an acquisition unit 23, an imaging unit 24, a drive unit 25, and a control unit 26. The communication unit 21, the storage unit 22, the acquisition unit 23, the imaging unit 24, the drive unit 25, and the control unit 26 are connected so as to be able to communicate with each other via, for example, a dedicated line.

The communication unit 21 includes a communication module connected to the network 40. For example, the communication unit 21 includes a communication module corresponding to the mobile communication standard such as the 4G and the 5G. According to the embodiment, the vehicle 20 is connected to the network 40 via the communication unit 21. The communication unit 21 transmits and receives various types of information via the network 40.

The communication unit 21 includes any receiver corresponding to the electronic signature issuing machine 10. For example, the communication unit 21 includes the receiver that is directly connected to the electronic signature issuing machine 10 such that the receiver can communicate with the electronic signature issuing machine 10 by the communication means such as wireless communication conforming to a predetermined communication standard. Such a receiver included in the communication unit 21 receives the signature of the user at the delivery destination as the electronic signature from the electronic signature issuing machine 10 using the communication means.

The communication unit 21 includes a transmitter paired with the receiver corresponding to the electronic signature issuing machine 10. For example, the communication unit 21 includes the transmitter that is directly connected to the electronic signature issuing machine 10 such that the transmitter can communicate with the electronic signature issuing machine 10 by the communication means such as wireless communication conforming to the predetermined communication standard. Such a transmitter included in the communication unit 21 transmits, to the electronic signature issuing machine 10, one password acquired in advance from the terminal device 30 upon receiving permission to issue the electronic signature, using the communication means.

The storage unit 22 is, for example, a semiconductor memory, a magnetic memory, or an optical memory. However, the storage unit 22 is not limited to these memories. The storage unit 22 functions as a main storage device, an auxiliary storage device, or a cache memory. The storage unit 22 stores any information used for the operation of the vehicle 20. The storage unit 22 stores a system program, an application program, various types of information received or transmitted by the communication unit 21, and the like. The information stored in the storage unit 22 can be updated with the information received from the network 40 via the communication unit 21.

The acquisition unit 23 includes one or more receivers corresponding to any satellite positioning system. For example, the acquisition unit 23 includes a global positioning system (GPS) receiver. The acquisition unit 23 acquires a measured value of the position of the vehicle 20 as the position information. The position information includes an address, a latitude, a longitude, an altitude, and the like. The acquisition unit 23 can acquire the position information of the vehicle 20. The acquisition unit 23 may acquire the position information of the vehicle 20 constantly or may acquire the position information periodically or irregularly.

The imaging unit 24 includes any imaging module capable of capturing an image of a surrounding area of the vehicle 20. For example, the imaging unit 24 includes one or more cameras. Each camera included in the imaging unit 24 is arranged at an appropriate position of the vehicle 20 such that the image of the surrounding area of the vehicle 20 can be captured. For example, the imaging unit 24 includes at least one of a front camera capable of capturing an image of a subject in front of the vehicle 20 and a rear camera capable of capturing an image of a subject behind the vehicle 20. The imaging unit 24 is not limited to this, and the imaging unit 24 may include an omnidirectional camera capable of capturing an image of the entire surrounding area of the vehicle 20.

The drive unit 25 includes any drive mechanism that allows loading of the package on the vehicle 20, delivery of the package loaded on the vehicle 20 to the user, unloading of the package loaded on the vehicle 20 to a delivery point, and a fine adjustment of the predetermined position of the unloaded package. For example, the drive unit 25 includes at least one of an arm mechanism driven by a motor and a slide mechanism that can slide the package linearly and that can move the package in and out of the main body of the vehicle 20.

The control unit 26 includes one or more processors. According to the embodiment, the "processor" is a general-purpose processor or a dedicated processor specialized for specific processing. However, the processor is not limited thereto. The control unit 26 is connected to each component constituting the vehicle 20 so as to be able to communicate with each other and controls the operation of the entire vehicle 20.

The configuration of the terminal device 30 included in the electronic signature issuing system 1 will be mainly described. As shown in FIG. 2, the terminal device includes a communication unit 31, a storage unit 32, an input unit 33, an output unit 34, and a control unit 35.

The communication unit 31 includes a communication module connected to the network 40. For example, the communication unit 31 includes a communication module corresponding to the mobile communication standard such as the 4G and the 5G or the Internet standard. According to the embodiment, the terminal device 30 is connected to the network 40 via the communication unit 31. The communication unit 31 transmits and receives various types of information via the network 40.

The storage unit 32 is, for example, a semiconductor memory, a magnetic memory, or an optical memory. However, the storage unit 32 is not limited to these memories. The storage unit 32 functions as a main storage device, an auxiliary storage device, or a cache memory. The storage unit 32 stores any information used for the operation of the terminal device 30. The storage unit 32 stores a system program, an application program, various types of information received or transmitted by the communication unit 31, and the like. The information stored in the storage unit 32 can be updated with the information received from the network 40 via the communication unit 31.

The input unit 33 includes one or more input interfaces that detect user input and acquire input information based on the user's operation. For example, the input unit 33 includes a physical key, a capacitive key, a touch screen integrated with a display of the output unit 34, a microphone that accepts voice input, and the like.

The output unit 34 includes one or more output interfaces that output information to notify the user. For example, the output unit 34 includes a display that outputs information as video and a speaker that outputs information as voice.

The control unit 35 includes one or more processors. According to the embodiment, the "processor" is a general-purpose processor or a dedicated processor specialized for specific processing. However, the processor is not limited thereto. The control unit 35 is connected to each of the components constituting the terminal device 30 so as to be able to communicate with each other and controls the operation of the entire terminal device 30.

Figure 3:
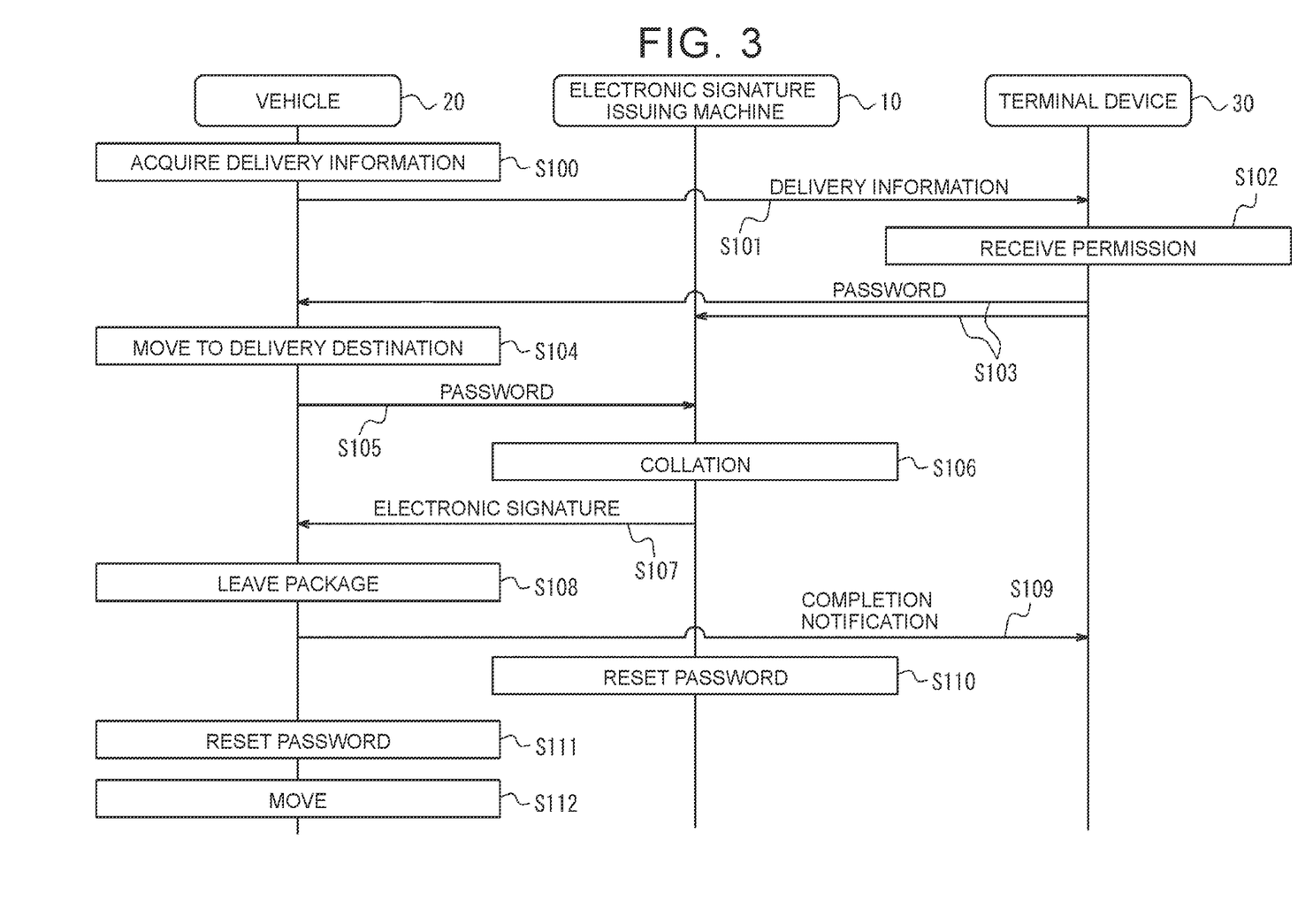
FIG. 3 is a sequence diagram for describing an example of an information processing method executed by the electronic signature issuing system shown in FIG. 1.

FIG. 3 is a sequence diagram for describing an example of an information processing method executed by the electronic signature issuing system 1 shown in FIG. 1. An example of the information processing method executed by the electronic signature issuing system 1 shown in FIG. 1 will be mainly described with reference to FIG. 3. The sequence diagram shown in FIG. 3 shows a flow of a basic process of the information processing method executed by the electronic signature issuing system 1.

In step S100, the control unit 26 of the vehicle 20 acquires delivery information of the package. In the present disclosure, the "delivery information" includes any information required for the delivery of the package by the vehicle 20. The delivery information includes, for example, the scheduled delivery date and time of the package, the destination of the package in the delivery, and the product content of the package to be delivered. For example, the control unit 26 captures an image of an invoice of the package using the imaging unit 24 to acquire the image of the invoice. The control unit 26 may acquire the image itself as the delivery information, or may use any technique such as image analysis to acquire, as the delivery information, text information or the like obtained by processing the acquired image as information.

In step S101, the control unit 26 of the vehicle 20 notifies the user at the delivery destination of the delivery information of the package acquired in step S100 in advance. More specifically, the control unit 26 transmits the delivery information of the package acquired in step S100 to the terminal device 30 via the communication unit 21 and the network 40.

For example, the control unit 26 may capture the image of the invoice of the package and provide it to the terminal device 30 of the user as an image, or provide the terminal device 30 of the user with the text information or the like extracted based on the image. As described above, the control unit 35 of the terminal device 30 receives the delivery information of the package from the vehicle 20 via the network 40 and the communication unit 31.

In step S102, the control unit 35 of the terminal device 30 outputs the delivery information of the package acquired in step S101 to the output unit 34 for confirmation by the user. The control unit 35 receives permission to issue an electronic signature using the input unit 33 from the user who has confirmed the delivery information of the package acquired in step S101 by the output unit 34.

In step S103, the control unit 35 of the terminal device 30 provides one password to both the electronic signature issuing machine 10 and the vehicle 20 upon receiving the permission to issue the electronic signature in step S102. More specifically, the control unit 35 transmits one password received from the user using the input unit 33 to both the electronic signature issuing machine 10 and the vehicle 20 via the communication unit 31 and the network 40.

When the terminal device 30 of the user who has confirmed the delivery information of the package in step S102 receives the permission to issue the electronic signature, the control unit 13 of the electronic signature issuing machine 10 acquires the one password shared with the vehicle 20 from the terminal device 30. More specifically, the control unit 13 receives the one password from the terminal device 30 via the network 40 and the communication unit 11. The control unit 13 stores the received one password in the storage unit 12. As described above, the one password and the delivery destination of the package where the electronic signature issuing machine 10 is installed are associated with each other on a one-to-one basis.

When the terminal device 30 of the user who has confirmed the delivery information of the package in step S102 receives the permission to issue the electronic signature, the control unit 26 of the vehicle 20 acquires the one password shared with the electronic signature issuing machine 10 from the terminal device 30. More specifically, the control unit 26 receives the one password from the terminal device 30 via the network 40 and the receiver included in the communication unit 21. The control unit 26 stores the received one password in the storage unit 22 in association with the delivery information acquired in step S100. As described above, the one password and the package delivered by the vehicle 20 are associated with each other on a one-to-one basis.

In step S104, the control unit 26 of the vehicle 20 drives the vehicle 20 such that the vehicle 20 moves to the delivery destination while autonomously delivering the package.

In step S105, when the vehicle 20 arrives at the delivery destination, the control unit 26 of the vehicle 20 executes communication with the electronic signature issuing machine 10 installed at the delivery destination for collating the package with the delivery destination. The control unit 26 provides the electronic signature issuing machine 10 with the password acquired in step S103. More specifically, the control unit 26 uses the transmitter included in the communication unit 21 to transmit the password acquired in step S103 to the electronic signature issuing machine 10.

Accordingly, the control unit 13 of the electronic signature issuing machine 10 executes communication with the vehicle 20 that has arrived at the delivery destination for collating the package with the delivery destination, and acquires the password from the vehicle 20. More specifically, the control unit 13 receives the password acquired by the vehicle 20 in step S103 from the vehicle 20 using the communication unit 11.

In step S106, the control unit 13 of the electronic signature issuing machine 10 collates the package with the delivery destination. More specifically, the control unit 13 determines whether the password acquired in step S105 matches a password owned by the electronic signature issuing machine 10.

In step S107, the control unit 13 of the electronic signature issuing machine 10 provides the electronic signature to the vehicle 20 when a collation is achieved between the package and the delivery destination in step S106. More specifically, when the control unit 13 determines in step S106 that the password acquired in step S105 matches the password owned by the electronic signature issuing machine 10, the control unit 13 provides the vehicle 20 with the electronic signature. The control unit 13 transmits the electronic signature to the receiver included in the communication unit 21 of vehicle 20 via the communication unit 11.

The control unit 26 of the vehicle 20 acquires the electronic signature from the electronic signature issuing machine 10 when the collation is achieved between the package and the delivery destination in step S106. More specifically, when the password acquired by the electronic signature issuing machine 10 in step S105 matches the password owned by the electronic signature issuing machine 10 in step S106, the control unit 26 acquires the electronic signature from the electronic signature issuing machine 10. The control unit 26 receives the electronic signature from the electronic signature issuing machine 10 via the receiver included in the communication unit 21.

In step S108, the control unit 26 of the vehicle 20 drives the vehicle 20 such that the vehicle 20 leaves the package at the delivery destination after acquiring the electronic signature in step S107.

In step S109, the control unit 26 of the vehicle 20 notifies the user that the package has been left at the delivery destination. More specifically, the control unit 26 transmits a completion notification indicating that the package has been left at the delivery destination to the terminal device 30 of the user via the communication unit 21 and the network 40. The control unit 35 of the terminal device 30 receives such a completion notification from the vehicle 20 via the network 40 and the communication unit 31. The control unit 35 outputs the acquired completion notification to the output unit 34 as necessary to cause the user to recognize that the package has been left.

In step S110, the control unit 13 of the electronic signature issuing machine 10 resets the password acquired in step S103 when the issuance of the electronic signature is completed in step S107.

In step S111, the control unit 26 of the vehicle 20 resets the password acquired in step S103 after transmitting the completion notification in step S109.

In step S112, the control unit 26 of the vehicle 20 drives the vehicle 20 such that the vehicle 20 moves from the delivery point in the delivery destination to the next destination.

Figure 4:
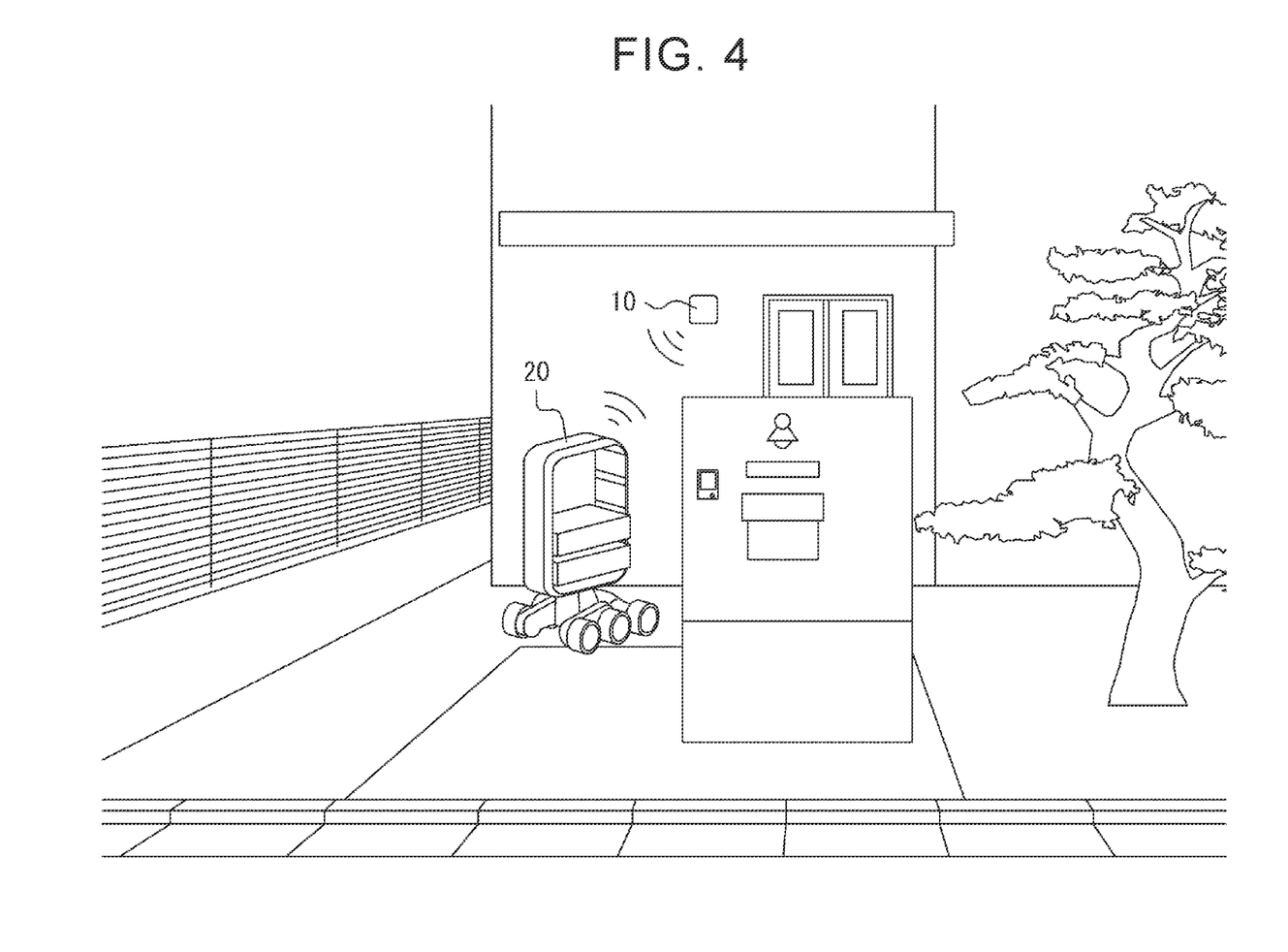
FIG. 4 is a schematic diagram for describing a processing content in the electronic signature issuing system shown in FIG. 1.

FIG. 4 is a schematic diagram for describing a processing content in the electronic signature issuing system 1 shown in FIG. 1.

When the vehicle 20 moves to the delivery destination according to the destination of the package included in the acquired delivery information of the package, the vehicle 20 identifies the electronic signature issuing machine 10 installed at the delivery destination by the imaging unit 24 or the like, and approaches the electronic signature issuing machine 10 such that the vehicle 20 enters a communication range of the electronic signature issuing machine 10. Accordingly, the electronic signature issuing machine 10 is connected to the vehicle 20 that autonomously delivers the package so as to be able to communicate with the vehicle 20. More specifically, the electronic signature issuing machine 10 is directly connected to the transmitter and the receiver included in the communication unit 21 of the vehicle 20 so as to be able to communicate with the transmitter and the receiver by the communication means such as wireless communication according to the predetermined communication standard.

When the vehicle 20 is directly connected to the electronic signature issuing machine 10 so as to be able to communicate with the electronic signature issuing machine 10, the password acquired in advance from the terminal device 30 is transmitted to the electronic signature issuing machine 10 using the transmitter included in the communication unit 21. Based on the password received from the vehicle 20, the electronic signature issuing machine 10 collates the package with the delivery destination.

The electronic signature issuing machine 10 transmits the electronic signature to the receiver included in the communication unit 21 of the vehicle 20 when the collation is achieved. Accordingly, the vehicle 20 leaves the package and completes the delivery of the package. On the other hand, when the collation is not achieved, that is, when the password received from the vehicle 20 does not match the password owned by the electronic signature issuing machine 10, the electronic signature issuing machine 10 transmits any information indicating the collation failure instead of the electronic signature to the receiver included in the communication unit 21 of the vehicle 20. Accordingly, the vehicle 20 starts moving to take the package back or deliver the package to another correct delivery destination without leaving the package.

According to the embodiment as described above, the erroneous delivery of the package in the unattended delivery service is suppressed. For example, the vehicle 20 executes communication with the electronic signature issuing machine 10 installed at the delivery destination for collating the package with the delivery destination, and acquires the electronic signature from the electronic signature issuing machine 10 when the collation is achieved between the package and the delivery destination. The vehicle 20 leaves the package only after receiving the issuance of the electronic signature from the electronic signature issuing machine 10 installed at the delivery destination. Even when the vehicle 20 arrives at the incorrect delivery destination, the password owned by the electronic signature issuing machine 10 installed at the delivery destination and the password owned by the vehicle 20 are different from each other, so that the collation is not achieved in the electronic signature issuing machine 10, and the electronic signature is not received. Therefore, the vehicle 20 can easily recognize that the delivery destination is incorrect, and takes the package back or delivers the package to the correct delivery destination, so that it is possible to suppress the erroneous delivery of the package easily. As described above, the reliability from the user and the convenience for the user relative to the package delivery service are improved.

The vehicle 20 notifies the user at the delivery destination of the delivery information of the package in advance, so that the user can confirm whether the delivery information accurately matches the package to be delivered. By allowing the user to confirm the delivery information of the package in advance, the erroneous delivery of the package in the unattended delivery service can be further suppressed. Therefore, the reliability from the user and the convenience for the user relative to the package delivery service are further improved.

The delivery information includes the destination of the package, so that the vehicle 20 can recognize the address of the delivery destination based on the delivery information acquired in advance. The vehicle 20 can deliver the package to the address corresponding to the destination based on the delivery information.

The control unit 26 of the vehicle 20 captures the image of the invoice of the package and provides it to the terminal device 30 of the user as the image, so that the user can directly confirm the delivery information from the image of the invoice. The electronic signature issuing system 1 can further simplify prior confirmation of the delivery information by the user, thereby improving the convenience for the user. In addition, the user can more accurately confirm the delivery information based on the image of the invoice. Therefore, the erroneous delivery of the package in the unattended delivery service is further suppressed. As a result, the reliability from the user and the convenience for the user relative to the package delivery service are further improved.

When the control unit 26 of the vehicle 20 acquires the one password shared with the electronic signature issuing machine 10 after receiving the permission to issue the electronic signature, the electronic signature issuing system 1 can safely collate the package with the delivery destination in a state of enhanced confidentiality by using the password. Accordingly, the reliability from the user and the convenience for the user relative to the package delivery service are further improved.

The control unit 26 of the vehicle 20 provides the password to the electronic signature issuing machine 10 at the delivery destination, so that the electronic signature issuing machine 10 can more correctly collate the package with the delivery destination based on the one password shared with the vehicle 20. Therefore, the erroneous delivery of the package in the unattended delivery service is further suppressed. As a result, the reliability from the user and the convenience for the user relative to the package delivery service are further improved.

When the password matches the password owned by the electronic signature issuing machine 10, the vehicle 20 acquires the electronic signature from the electronic signature issuing machine 10, which allows the user to easily recognize that the delivery destination of the package is correct. The vehicle 20 acquires the electronic signature, so that the delivery of the package can be completed.

According to the embodiment as described above, the erroneous delivery of the package in the unattended delivery service is suppressed. For example, the electronic signature issuing machine 10 executes communication with the vehicle 20 for collating the package with the delivery destination, and provides the vehicle 20 with the electronic signature when the collation is achieved between the package and the delivery destination. The electronic signature issuing machine 10 allows the electronic signature to be issued only to the vehicle 20 for which the collation has been achieved, and the package to be left. Even when the incorrect package is delivered by the vehicle 20, the password owned by the vehicle and the password owned by the electronic signature issuing machine 10 are different from each other, so that the electronic signature issuing machine 10 can determine that the collation is not achieved, and can refrain from issuing the electronic signature. Therefore, the electronic signature issuing machine 10 can cause the vehicle 20 to recognize that the delivery destination is incorrect, and take the package back or deliver the package to another correct delivery destination. Accordingly, the electronic signature issuing machine 10 can easily suppress the erroneous delivery of the package. As described above, the reliability from the user and the convenience for the user relative to the package delivery service are improved.

When the control unit 13 of the electronic signature issuing machine 10 acquires the one password shared with the vehicle 20 after receiving the permission to issue the electronic signature, the electronic signature issuing system 1 can safely collate the package with the delivery destination in a state of enhanced confidentiality by using the password. Accordingly, the reliability from the user and the convenience for the user relative to the package delivery service are further improved.

By acquiring the password from the vehicle 20 that has arrived at the delivery destination, the electronic signature issuing machine 10 can more accurately collate the package with the delivery destination based on the one password shared with the vehicle 20. Therefore, the erroneous delivery of the package in the unattended delivery service is further suppressed. As a result, the reliability from the user and the convenience for the user relative to the package delivery service are further improved.

When the control unit 13 of the electronic signature issuing machine 10 determines that the password matches the password owned by the electronic signature issuing machine 10, the electronic signature is provided to the vehicle 20 to allow the vehicle 20 to easily recognize that the delivery destination of the package is correct. The electronic signature issuing machine 10 issues the electronic signature, so that the delivery of the package to the vehicle 20 can be completed.

Although the present disclosure has been described above based on the drawings and the embodiment, it should be noted that those skilled in the art can make various modifications and alterations thereto based on the present disclosure. It should be noted, therefore, that these modifications and alterations are within the scope of the present disclosure. For example, the functions, etc. included in the configurations, steps, or the like can be rearranged so as not to be logically inconsistent, and a plurality of configurations, steps, or the like can be combined into one or divided.

For example, at least a part of the processing operations executed in the vehicle 20 in the above embodiment may be executed in the electronic signature issuing machine 10 or the terminal device 30. At least a part of the processing operations executed in the electronic signature issuing machine 10 or the terminal device 30 may be executed in the vehicle 20.

For example, at least a part of the processing operations executed in the electronic signature issuing machine 10 in the above embodiment may be executed in the vehicle 20 or the terminal device 30. At least a part of the processing operations executed in the vehicle 20 or the terminal device 30 may be executed in the electronic signature issuing machine 10.

For example, a configuration is also possible in which a general-purpose electronic device such as a smartphone or a computer functions as the vehicle 20 or the electronic signature issuing machine 10 according to the above embodiment. Specifically, a program describing processing contents for realizing each function of the vehicle 20 or the electronic signature issuing machine 10 according to the above embodiment is stored in the memory of the electronic device, and the program is read and executed by the processor of the electronic device. Thus, the disclosure according to the embodiment can also be realized as the program that can be executed by the processor.

Alternatively, the disclosure according to the embodiment can be realized as a non-transitory computer-readable medium for storing a program executable by one or more processors to cause the vehicle 20, the electronic signature issuing machine 10, or the like according to the embodiment to execute each function. The non-transitory computer-readable medium is an example of a storage medium. It should be understood that the above configurations are also included in the scope of the present disclosure.

In the above embodiment, it has been described that the electronic signature issuing machine 10 collates the package with the delivery destination. However, the present disclosure is not limited to this. Instead of or in addition to the electronic signature issuing machine 10, the vehicle 20 may acquire a password from the electronic signature issuing machine 10 and execute a similar collation process.

In the above embodiment, it has been described that the electronic signature issuing machine 10 collates the package with the delivery destination, and the terminal device 30 issues the one password. However, the present disclosure is not limited to this. For example, the electronic signature issuing system 1 may further include an information processing device that is one or more server devices that can communicate with each other, and the information processing device may collectively execute these processes. Such an information processing device is not limited to the server device, and may be any general-purpose electronic device such as a PC or a smartphone, or may be another electronic device dedicated to the electronic signature issuing system 1.

For example, instead of or in addition to the electronic signature issuing machine 10, the information processing device may execute the above-described series of processing operations regarding the electronic signature issuing machine 10. In this case, the information processing device executes the corresponding steps in the above sequence diagram while transmitting and receiving information necessary for the processes to and from the electronic signature issuing machine 10, the vehicle 20, and the terminal device 30.

For example, instead of or in addition to the terminal device 30, the information processing device may execute the above-described series of processing operations regarding the terminal device 30. In this case, the information processing device executes the corresponding steps in the above sequence diagram while transmitting and receiving information necessary for the processes to and from the electronic signature issuing machine 10, the vehicle 20, and the terminal device 30.

In the above embodiment, it has been described that the vehicle 20 notifies the user at the delivery destination of the delivery information of the package in advance. However, the present disclosure is not limited to this. The vehicle 20 may transmit the delivery information to the information processing device as the server device described above instead of or in addition to such a notification process.

In the above embodiment, it has been described that when the terminal device 30 of the user who has confirmed the delivery information receives the permission to issue the electronic signature, the vehicle 20 acquires the one password shared with the electronic signature issuing machine 10 from the terminal device 30. However, the present disclosure is not limited to this. Instead of or in addition to the terminal device 30, the information processing device as the above server device that has received the delivery information may execute a permission process for the issuance of the electronic signature. The vehicle 20 may acquire the one password shared with at least one of the electronic signature issuing machine 10 and the information processing device from the information processing device instead of the terminal device 30.

In the above embodiment, it has been described that the vehicle 20 provides the password to the electronic signature issuing machine 10 upon arriving at the delivery destination. However, the present disclosure is not limited to this. Upon arriving at the delivery destination, the vehicle 20 may provide the password to the above information processing device instead of or in addition to the electronic signature issuing machine 10.

In the above embodiment, it has been described that the vehicle 20 acquires the electronic signature from the electronic signature issuing machine 10 when the password matches the password owned by the electronic signature issuing machine 10. However, the present disclosure is not limited to this. Instead of or in addition to such a process, the vehicle 20 may acquire the electronic signature from the above information processing device.

In the above embodiment, it has been described that when the terminal device 30 of the user who has confirmed the delivery information receives the permission to issue the electronic signature, the electronic signature issuing machine 10 acquires the one password shared with the vehicle 20 from the terminal device 30. However, the present disclosure is not limited to this. Instead of or in addition to the terminal device 30, the information processing device as the above server device that has received the delivery information may execute a permission process for the issuance of the electronic signature. The electronic signature issuing machine 10 may acquire the one password shared with at least one of the vehicle 20 and the information processing device from the information processing device instead of the terminal device 30.

In the above embodiment, it has been described that the electronic signature issuing machine 10 acquires the password from the vehicle 20 that has arrived at the delivery destination. However, the present disclosure is not limited to this. The electronic signature issuing machine 10 may not receive the password from the vehicle 20 that has arrived at the delivery destination.

In the above embodiment, it has been described that the electronic signature issuing machine 10 provides the electronic signature to the vehicle 20 when it is determined that the password matches the password owned by the electronic signature issuing machine 10. However, the present disclosure is not limited to this. Such a determination process may be executed by the above information processing device instead of or in addition to the electronic signature issuing machine 10. Instead of or in addition to the electronic signature issuing machine 10, the information processing device may execute the collation process and provide the electronic signature to the vehicle 20.

In the above embodiment, it has been described that the vehicle 20 directly executes communication with the electronic signature issuing machine 10 installed at the delivery destination within its communication range for collating the package with the delivery destination. However, the present disclosure is not limited to this. The vehicle 20 may execute a similar process to the process shown in FIG. 3 by indirectly connecting to the electronic signature issuing machine 10 via the network 40 such that the vehicle 20 can communicate with the electronic signature issuing machine 10 even before the vehicle 20 arrives at the delivery destination and even when the vehicle 20 is not within the communication range of the electronic signature issuing machine 10.

In the above embodiment, it has been described that the terminal device 30 receives the one password from the user using the input unit 33. However, the present disclosure is not limited to this. The terminal device 30 may automatically generate the one password at random on an installed application, for example.

A part of the embodiment of the present disclosure is shown as an example below. However, it should be noted that embodiment of the present disclosure is not limited to these.

Appendix 1

A vehicle that autonomously delivers a package includes
a control unit that executes communication with an electronic signature issuing machine installed at a delivery destination for collating the package with the delivery destination of the package, acquires an electronic signature from the electronic signature issuing machine when a collation is achieved between the package and the delivery destination, and drives the vehicle such that the package is left at the delivery destination.

Appendix 2

In the vehicle according to Appendix 1,
the control unit notifies a user at the delivery destination of delivery information of the package in advance.

Appendix 3

In the vehicle according to Appendix 2,
the delivery information includes a destination of the package.

Appendix 4

In the vehicle according to Appendix 2 or 3,
the control unit captures an image of an invoice of the package and provides the image of the invoice of the package to a terminal device of the user as an image.

Appendix 5

In the vehicle according to any one of Appendices 2 to 4,
the control unit acquires one password shared with the electronic signature issuing machine from a terminal device of the user who has confirmed the delivery information when the terminal device receives permission to issue the electronic signature.

Appendix 6

In the vehicle according to Appendix 5,
the control unit provides the password to the electronic signature issuing machine when the vehicle arrives at the delivery destination.

Appendix 7

In the vehicle according to Appendix 6,
the control unit acquires the electronic signature from the electronic signature issuing machine when the password matches a password owned by the electronic signature issuing machine.

Appendix 8

An electronic signature issuing system includes:
the vehicle according to any one of Appendices 1 to 7;
an electronic signature issuing machine installed at the delivery destination and connected to the vehicle that autonomously delivers the package so as to be able to communicate with the vehicle; and
a terminal device used by a user at the delivery destination.

Appendix 9

A program causes a vehicle that autonomously delivers a package to execute an operation including:
executing communication with an electronic signature issuing machine installed at a delivery destination for collating the package with the delivery destination of the package;
acquiring an electronic signature from the electronic signature issuing machine when a collation is achieved between the package and the delivery destination; and
driving the vehicle such that the package is left at the delivery destination.

Appendix 10

In the program according to Appendix 9,
the operation includes notifying a user at the delivery destination of delivery information of the package in advance.

Appendix 11

In the program according to Appendix 10,
the delivery information includes a destination of the package.

Appendix 12

In the program according to Appendix 10 or 11,
the operation includes capturing an image of an invoice of the package and providing the image of the invoice of the package to a terminal device of the user as an image.

Appendix 13

In the program according to any one of Appendices 10 to 12, the operation includes acquiring one password shared with the electronic signature issuing machine from a terminal device of the user who has confirmed the delivery information when the terminal device receives permission to issue the electronic signature.

Appendix 14

In the program according to Appendix 13,
the operation includes providing the password to the electronic signature issuing machine when the vehicle arrives at the delivery destination.

Appendix 15

In the program according to Appendix 14,
the operation includes acquiring the electronic signature from the electronic signature issuing machine when the password matches a password owned by the electronic signature issuing machine.

Appendix 16

An electronic signature issuing machine installed at a delivery destination of a package and connected to a vehicle that autonomously delivers the package so as to be able to communicate with the vehicle includes
a control unit that executes communication with the vehicle for collating the package with the delivery destination, and provides an electronic signature to the vehicle when a collation is achieved between the package and the delivery destination.

Appendix 17

In the electronic signature issuing machine according to Appendix 16,
the control unit acquires one password shared with the vehicle from a terminal device of a user who has confirmed delivery information of the package when the terminal device receives permission to issue the electronic signature.

Appendix 18

In the electronic signature issuing machine according to Appendix 17,
the delivery information includes a destination of the package.

Appendix 19

In the electronic signature issuing machine according to Appendix 17 or 18,
the control unit acquires the password from the vehicle that has arrived at the delivery destination.

Appendix 20

In the electronic signature issuing machine according to Appendix 19,
when determination is made that the password matches a password owned by the electronic signature issuing machine, the control unit provides the electronic signature to the vehicle.

What is claimed is:
1. A vehicle that autonomously delivers a package, the vehicle comprising
a control unit configured to:
notify a user at a delivery destination of delivery information of the package;
receive a first password from a terminal device;
transmit the first password to an electronic signature issuing machine installed at the delivery destination;
communicate with the electronic signature issuing machine installed at the delivery destination for collating the package with the delivery destination of the package;
when the first password matches a second password owned by the electronic signature issuing machine, acquire an electronic signature from the electronic signature issuing machine; and drive the vehicle such that the package is left at the delivery destination.

2. The vehicle according to claim 1, wherein the control unit notifies the user at the delivery destination of the delivery information of the package in advance.

3. The vehicle according to claim 2, wherein the control unit captures an image of an invoice of the package and provides the image of the invoice of the package to the terminal device as an image.

4. The vehicle according to claim 1, wherein the control unit transmits the first password to the electronic signature issuing machine when the vehicle arrives at the delivery destination.

5. An electronic signature issuing system comprising:
the vehicle according to claim 1;
the electronic signature issuing machine installed at the delivery destination and connected to the vehicle that autonomously delivers the package so as to be able to communicate with the vehicle; and
the terminal device used by the user at the delivery destination.

6. A non-transitory storage medium storing a program that causes a vehicle that autonomously delivers a package to execute an operation including:

notifying a user at a delivery destination of delivery information of the package;

receiving a first password from a terminal device;

transmitting the first password to an electronic signature issuing machine installed at the delivery destination;

communicating with the electronic signature issuing machine installed at the delivery destination for collating the package with the delivery destination of the package;

when the first password matches a second password owned by the electronic signature issuing machine, acquiring an electronic signature from the electronic signature issuing machine; and driving the vehicle such that the package is left at the delivery destination.

7. The storage medium according to claim 6, wherein the operation includes notifying the user at the delivery destination of the delivery information of the package in advance.

8. The storage medium according to claim 7, wherein the operation includes capturing an image of an invoice of the package and providing the image of the invoice of the package to the terminal device as an image.

9. The storage medium according to claim 6, wherein the operation includes transmitting the first password to the electronic signature issuing machine when the vehicle arrives at the delivery destination.

* * * * *